Patented Jan. 15, 1952

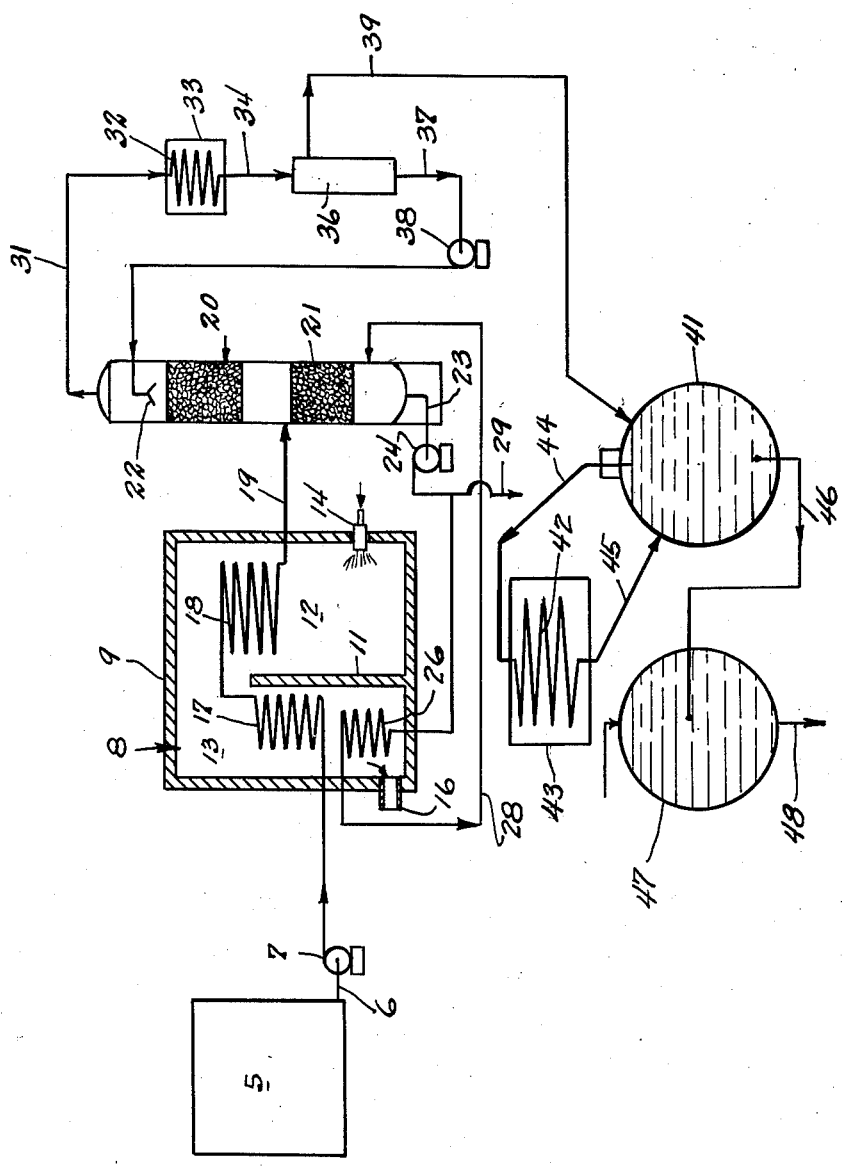

2,582,920

UNITED STATES PATENT OFFICE 2,582,920

HIGH PURITY DICYCLOPENTADIENE

Roger T. Businger, Pittsburgh, Pa., and Howard L. Gerhart, Milwaukee, Wis., assignors to Pittsburgh Plate Glass Company, Allegheny County, Pa., a corporation of Pennsylvania Application November 7, 1947, Serial No. 784,636

9 Claims. (Cl. 260—666)

The present invention relates to a process of and an apparatus for obtaining either dicyclopentadiene or cyclopentadiene from a crude stock containing objectionable impurities, in a substantially pure state and it has particular relation to a process of obtaining dicyclopentadiene from crude stock, in which dicyclopentadiene and other polymers of cyclopentadiene in said stock are first cracked to form highly volatile cyclopentadiene that can easily be separated from the impurities by distillation and then repolymerized to form dicyclopentadiene free from or nearly free from objectionable constituents.

One object of the invention is to provide a process of dimerizing cyclopentadiene which operates simply and efficiently.

A second object is to provide a process of polymerizing cyclopentadiene to form dicyclopentadiene which results in a product which is sufficiently low in melting point to be conveniently handled by tank cars or stored in tanks or similar equipment.

A third object is to provide a process of and an apparatus for polymerizing cyclopentadiene in which desirable temperature conditions are maintained in the polymerization zone substantially automatically.

A fourth object is to provide a simple and efficient process of and an apparatus for cracking dicyclopentadiene and other lower polymers of cyclopentadiene to form monomeric cyclopentadiene.

A fifth object of the invention is to provide an efficient process of obtaining pure cyclopentadiene from a crude stock of dicyclopentadiene without substantial loss of cyclopentadiene or cyclopentadiene polymers.

A sixth object of the invention is to provide an efficient process of obtaining dicyclopentadiene in highly purified form from a crude material containing impurities from which it is difficult efficiently to separate dicyclopentadiene by fractional distillation.

These and other objects of the invention will be apparent from consideration of the following specification and the appended claims.

Dicyclopentadiene is an unsaturated, cyclic hydrocarbon which is now employed extensively in the manufacture of certain resins, as a modifier of drying oils, as a primary material in the synthesis of certain chemical compounds and such like uses. It is commonly obtained in the crude state in the various cracking operations to which hydrocarbons are conventionally subjected in the preparation of fuels for motors or the preparation of dienes suitable for polymerization to form synthetic rubbers. As obtained, the compound usually includes impurities such as styrene, coumarone, indene and the like which are near it in boiling point and which by conventional methods of distillation can be separated only with difficulty and to an unsatisfactory degree.

It is to be recognized that cyclopentadiene and its lower polymers form a system the composition of which with respect to monomer, dimer, trimer, tetramer, etc. varies greatly with the temperature to which it is subjected. At and around 200° C. dicyclopentadiene is present in large amounts or predominately. As the temperature of the system increases dicyclopentadiene or the other low polymers of cyclopentadiene tend more and more to crack to form the monomer. At temperatures around 300° C. and above the monomer exists almost exclusively, but polymerization to form dimer or other lower polymers takes place when the mixture is again cooled to a lower range, e. g. to 200° C. and below. In these lower ranges, the dicyclopentadiene and lower polymers reappear. This strong tendency of cyclopentadiene to polymerize at temperatures around and slightly above the boiling point of dicyclopentadiene (172° C.) constitutes a source of further difficulty in the preparation of purified products. Since in a cracking and distilling operation involving use of commercial stocks, monomeric cyclopentadiene is likely to dimerize before it is separated from its impurities and thus minimize yields of pure material.

The present invention involves a process of obtaining cyclopentadiene and dicyclopentadiene substantially free from objectionable impurities and without substantial loss of the cyclopentadiene or dicyclopentadiene. In the process, the dicyclopentadiene and perhaps other lower polymers of cyclopentadiene in a crude stock are continuously cracked to monomeric cyclopentadiene in a heated tube of comparatively small diameter and extensive length so that the mixture is quickly converted to a vapor state, cracked and expelled from the cracking zone. Subsequently the vapors are quickly cooled to prevent polymerization of the cyclopentadiene but to condense the higher boiling impurities, the impurities being maintained at such temperatures as substantially to preclude the presence of dimeric cyclopentadiene or other forms of cyclopentadiene.

For a better understanding of the invention, reference may now be had to the accompanying drawings in which the single figure illustrates diagrammatically a process of and an apparatus for obtaining relatively pure cyclopentadiene from crude stocks containing dicyclopentadiene in admixture with impurities from which it is difficult to separate it by conventional distillations and for redimerizing the pure cyclopentadiene.

In the practice of the invention crude cyclopentadiene of a boiling point within the range of approximately 300 to 400° F. and including considerable amounts of such impurities as styrene, coumarone, indene and the like but also containing higher polymers of cyclopentadiene may be stored in suitable amount in any conventional container 5. Preferably the mixture is fluid so that it can be caused to flow through the conduits of the apparatus. If it is not sufficiently fluid it may be heated to melt it by any appropriate means (not shown). The crude stock is drawn off from the container through conduit 6 at an appropriate speed for feeding to the cracking apparatus, the rate of feed of course will vary with the size of the apparatus, the temperature of operation and such like factors. The flow may be promoted and regulated by a pump indicated diagrammatically at 7 in the line 6 which, of course, generates pressure to propel the fluids through the pipe. The molten stock, therefore, flows through the tube as a solid, continuous stream.

The fluid stock is conducted to a pipe still 8 comprising a shell or furnace 9 with a partition or baffle 11 dividing it into a higher temperature section 12 and a lower temperature section 13. Heat is supplied to the section 12 by a gas burner 14 or other convenient heating element projecting through one wall of the shell 9. Combustion gases are withdrawn from the furnace through a port 16 leading to a stack (not shown).

A coil of tubing 17 in the section 13 receives the liquid stock from the line 6 and subsequently transmits it or its vapors to a second coil 18 also of piping in the hot section 12 of the furnace. It is to be observed that the coils are mere tubes or pipes, coiled for conservation of space. The volume of stock contained in these coils is small. The stock is also continuously moving forward from a cooler to a hotter zone. Within a short period after entering the coils, it is vaporized and its vaporization causes it to flash forwardly through the tubes at an accelerated rate into the highly heated cracking zones, e. g. into the coil 18 where the dicyclopentadiene and lower polymers of cyclopentadiene are largely converted to cyclopentadiene. This cracking with resultant multiplication of molecules of course results in a further expansion of the mixture and a further acceleration of the rate of flow of the vapors through the cracking coils. The dicyclopentadiene and lower polymers of cyclopentadiene are practically completely converted to the monomer while the impurities such as styrene, coumarone and the like are but little effected or at least are not subjected to monomerization.

The vapor mixture, including the cyclopentadiene as well as the impurities of the original stock flash through the outgoing conduit 19 from the coil 18 to a cooling and separating zone preferably in an intermediate portion, e. g. near the mid portion of a tower or column 20 at a temperature of about 575 to 800° F. The latter element, for purposes of efficiency, may be appropriately packed with a loose packing material or if preferred it may be provided with baffles or plates designed to promote effective separation of the more volatile from the less volatile products of the cracking operation in a manner well understood in the distillation art. The packing is designated at 21. The vapors in the column are cooled almost instantly to a temperature well above the boiling point of cyclopentadiene and preferably below the boiling point of the impurities of the vapor mixture by introducing a shower of liquid cyclopentadiene through a spray head 22 disposed in the upper portion of the column.

The cooling condenses the higher boiling impurities of the vapor mixture herein designated as "bottoms" and they are drawn off at the bottom of the column through a conduit 23. A part thereof is forced by pump 24 through a coil 26 in the lower part of the zone 13 in the furnace chamber. Here the impurities so withdrawn are reheated to a temperature somewhat below the boiling point, but above the point at which dimers and other lower polymers of cyclopentadiene can exist in substantial amounts. This hot but liquid mixture is recycled through a conduit 28 to a zone above the bottom of the column 20 but below the inlet of vapors from coil 18. The heated mixture of impurities maintains a temperature in the bottom of the column sufficient to volatilize practically all cyclopentadiene in the zone as a monomer and to assure its collection in the top of the column. Such part of the bottoms or impurities discharged from the lower portion of the column as is not required for cycling to maintain the temperature of the lower zone of the column may be drawn off for storage or for other purposes through a conduit 29 branching from the conduit 23.

Vapors of cyclopentadiene collecting in the top of the column 20 are drawn off through conduit 31 to a condenser coil 32 in a container 33 of a cooling medium, e. g. ice water or other relatively cold liquid of a temperature sufficiently low to ensure condensation of cyclopentadiene. The condensed monomer is discharged through a line 34 to a receiver 36 where a part is drawn off through line 37 and forced by pump 38 back to spray head 22 in order quickly to cool the upper zones of the column or tower below the point at which rapid dimerization can occur. The column preferably is operated at atmospheric pressure but a range of pressures, e. g from 25 mm. up to 3 or 4 atmospheres is contemplated.

Such part of the liquid monomer as is not required in the cooling operation is drawn off through a line 39 for dimerization in a receiver or tank 41. The latter is of considerable size in order to assure that the cyclopentadiene received therein will be afforded ample time for satisfactory dimerization before the product is discharged for permanent storage, shipment or use. This period will depend upon the temperature of storage. Long periods are permissible.

It will be understood that the dimerization of cyclopentadiene is exothermic in its nature. If large volumes of cyclopentadiene are being treated, this heat might cause excessive rise of temperature. In order to prevent such rise an appropriate cooling system may be provided. Such system may comprise a coil 42 in a cooling bath in a container 43. The coil at its upper end is connected with the vapor space above the liquid in container 41 by conduit 44 and its lower extremity is connected with the container by line 45. If the temperature of the liquid tends to rise excessively, large amounts of cyclopentadiene vapors will rise into the coil 42, where they are condensed and returned as a liquid to the main body, thus cooling the latter. The amount of cooling of course, is proportional to the amount of vapors generated which in turn is dependent upon the temperature of the system. The regulation of temperature is therefore highly stable and practically automatic.

The liquid cyclopentadiene is introduced continuously into the upper zones of the container 41 and the dimer product is drawn off preferably from a lower zone, e. g. at or near the bottom of the container and may be passed to storage in a second container 47. From the latter, it may be drawn off for shipment or other purposes through a conduit 48.

The apparatus as shown is essentially diagrammatic in character. Pumps 7, 24 and 38 have been indicated for purposes of assuring proper circulation of liquids in the system. The number and position of such element will be dictated by specific layouts of apparatus and the operating conditions. The installation of such parts at required points will be obvious. The same is also true of valves, pressure and temperature indicating devices and similar elements.

In the operation of the apparatus, the crude dicyclopentadiene stock having, for example, the boiling range of 300 to 400° F. is fed to coil 17 as a continuous stream. As previously stated the pipes of the coils in the still are small containing but small volumes of stock. The latter moves rapidly forward to hotter and hotter zones so that it is within a short time flashed into vapor which by reason of its expansion is pushed forward through coil 18 at an accelerated rate and is discharged very quickly to tower 20. The temperatures of the vapors at the point of discharging from coil 18 must be well above the cracking point of dicyclopentadiene, e. g. above about 392° F. It should not be so high as to cause excessive decomposition of cyclopentadiene or other products passing through the system. A range of about 392 to 800° F. would appear to cover most operating conditions and a range of about 550 to 700° F. would appear to be satisfactory. Good operation is obtained at 650° F. in most apparatus.

The total time of the liquids in coil 17 before cracking of dicyclopentadiene to form monomer is initiated is of secondary importance, since this is a preliminary warm up period. In actual operations it is about four minutes but it may be a fraction of a minute or several times 4 minutes, e. g. 20 minutes dependent upon the size of the apparatus and the speed of operation. It is desirable that the time in the cracking zone be cut to a minimum in order to avoid formation of coke like bodies that would clog the apparatus. The lower limit of time of cracking is imposed by the rate at which the vapors can be heated. Probably in a practicable commercial apparatus it is not much below ½ second. It should not be much above 5 seconds. About 1 to 2 seconds seems to be about the optimum for the apparatus shown.

It is desirable that the cyclopentadiene after it is formed, be cooled down as rapidly as possible, in order to prevent polymerizations. Probably it should not spend more than about 5 seconds in transit to cooling and separating tower 20. Zero time would be optimum but seldom can be attained in commercial operations.

The efficiency of operation is promoted by reason of small and relatively uniform bore or diameter of the various pipes and coils through which the fluids are flowing and by the absence of columns or other containers of large diameter through which they would flow slowly and in which they would remain for long periods before being cooled. The uniform diameter or bore of the various pipes, of course, provides a stream which is correspondingly uniform in transverse section. In a specific example dicyclopentadiene stock was fed to coil 17 and emerged after about 4 minutes at a temperature of about 430° F. It passed through high temperature coil as a vapor in about 1.14 seconds. It emerged in conduit 19 as a monomer at a temperature of about 690° F. and was transferred immediately to column 20 for elimination of impurities.

The top of the tower or column 20 must be maintained sufficiently hot to assure that all or nearly all of the cyclopentadiene passes off as a vapor, but it should not be so high as to maintain in vapor phase an excessive proportion of impurities. A temperature of about 110 to 200° F. would seem to answer most requirements. The bottom of the column 20, as previously shown, should be maintained sufficiently hot to assure thorough cracking of the dicyclopentadiene (if any) in the zone and to prevent dimerization of monomer but not so hot as to vaporize the impurities extensively or to cause an undue rise of the temperature in the upper zones of the column. A range of about 300 to 400° F. would appear to cover preferred conditions. About 300 or 330° F. constitutes a good average.

The container 41 preferably is operated at or near 200° F. since at this temperature polymerization of cyclopentadiene to form the dimer proceeds rapidly. At this temperature the product as obtained will contain a small percentage e. g. about 5% of cyclopentadiene which is to be preferred since it reduces the melting point of the mixture sufficiently to admit of convenient handling of the mixture as a liquid.

The forms of the invention herein described are by way of illustration. It will be apparent to those skilled in the art that numerous modifications may be made therein without departure from the spirit of the invention or the scope of the appended claims.

We claim:

1. A process of obtaining substantially pure dicyclopentadiene from a stock comprising dicyclopentadiene and impurities at least one of which is of a class consisting of styrene, coumarone and indene which process comprises continuously feeding liquid stock forwardly through an elongated tube heated to a temperature substantially above the cracking point of dicyclopentadiene in order quickly to vaporize the stock and crack the dicyclopentadiene, then quickly discharging the vapor mixture into an intermediate portion of a vertically elongated zone, the zone at said intermediate portion being at a temperature within a range of 575 to 800° F., the upper portion of the zone being maintained at a temperature of about 110 to 200 F., the lower portion of the zone being maintained at a temperature of about 300 to 400° F., withdrawing the cyclopentadiene vapors from the upper part of the vertically elongated zone, then condensing said vapors, returning a part of the condensate as a shower of essentially pure liquid cyclopentadiene to the upper portion of said zone to maintain said temperature 110 to 200° F. and storing the remaining portions of the condensate at a temperature of about 200° F. whereby to polymerize the cyclopentadiene to dicyclopentadiene, then drawing off the resultant mixture of cyclopentadiene and dicyclopentadiene from the polymerization zone.

2. A process of obtaining substantially pure dicyclopentadiene from a stock comprising dicyclopentadiene and impurities at least one of which is of a class consisting of styrene, coumarone and indene which process comprises flowing the liquid stock forwardly through an elongated tube heated to a temperature substantially above the cracking temperature of dicyclopentadiene in order quickly to vaporize the mixture and then to crack the dicyclopentadiene in the resultant vapor mixture, then quickly discharging the vapor mixture into the intermediate portion of a vertically elongated zone, said portion being maintained at a temperature of about 550 to 800° F., the upper portion of the zone being maintained at a temperature of about 110 to 200° F., the lower portion of the zone being maintained at a temperature of about 300 to 400° F. by withdrawing liquid impurities comprising styrene, coumarone and indene from the bottom of said zone, re-heating the impurities and returning them to the bottom portion, the cyclopentadiene from the upper portion of the elongated zone being condensed, a part of the condensate being returned as essentially pure liquid cyclopentadiene to said upper portion to cool said upper portion to the specified temperature and a part of the condensate being stored at a temperature of about 200° F. to dimerize the cyclopentadiene.

3. In a method of cracking dicyclopentadiene to form cyclopentadiene, the steps which comprise forcing a substantially solid and continuous stream of molten dicyclopentadiene stock into a first zone of a coiled pipe of substantially uniform bore, said zone being heated to a temperature of 300 to 400° F. to vaporize said stock in the zone, then into a cracking zone in said pipe heated to a temperature in the range of about 550 to 800° F. to crack dicyclopentadiene in the latter zone, the vapors being maintained in said cracking zone for a period within the range of ½ to 5 seconds, subsequently discharging the cyclopentadiene vapors from the cracking zone into a cooling zone.

4. The steps as defined in claim 3 in which the cyclopentadiene vapors are cooled to about 100 to 200° F. by showering them with liquid cyclopentadiene.

5. The steps as defined in claim 3 in which cooling of the vapors is effected by showering them with liquid cyclopentadiene.

6. The steps as defined in claim 3 in which the cooling operation is effected first by showering the vapors in a separating zone with liquid cyclopentadiene quickly to cool them to a range of about 110 to 200° F., thus condense out impurities, and the relatively cool vapors of cyclopentadiene are led off and condensed.

7. In a method of treating a stock containing dicyclopentadiene and impurities, boiling at a temperature higher than cyclopentadiene, at least one of which is from a class consisting of styrene, indene and coumarone, the steps of feeding said stock as a continuous, solid stream into an elongated pipe, applying heat externally of the pipe in a zone contiguous to the inlet end to heat the stock as it flows to a temperature sufficient to vaporize the dicyclopentadiene and the impurities and to flash the vapors at an accelerated rate into a cracking zone heated to a temperature between about 392 and 800° F. selectively to crack the vapors of dicyclopentadiene into cyclopentadiene, quickly withdrawing the resultant vapors of cyclopentadiene and the impurities from the pipe and condensing out and removing the impurities from the cyclopentadiene without returning them to the cracking zone.

8. The steps as defined in claim 7 in which the cyclopentadiene is subsequently repolymerized to form pure cyclopentadiene.

9. In a method of treating a stock containing dicyclopentadiene and impurities boiling at a temperature higher than cyclopentadiene at least one of which is from the class consisting of styrene, indene, and coumarone, the steps of feeding said stock forwardly from a source of supply as a continuous small stream of substantially uniform transverse section through a zone heated to a temperature progressively to heat the stock as it flows, to a temperature sufficient to vaporize the dicyclopentadiene and the impurities associated therewith and to flash the vapors of dicyclopentadiene and impurities as a stream at an accelerated rate into a cracking zone heated to a temperature between about 392 and 800° F. selectively to crack substantially all of the vapors of dicyclopentadiene into cyclopentadiene, quickly withdrawing the resultant vapors of cyclopentadiene and the impurities from the cracking zone, quickly cooling the mixture below the temperature at which rapid dimerization of cyclopentadiene can occur but above the temperature at which the cyclopentadiene vapor condenses, and condensing out and removing the impurities from the cyclopentadiene vapor.

ROGER T. BUSINGER.
HOWARD L. GERHART.

REFERENCES CITED

The following references are of record in the file of this patent:

UNITED STATES PATENTS

| Number | Name | Date |
|---|---|---|
| 2,349,047 | Lycan et al. | May 16, 1944 |
| 2,372,237 | Ward | Mar. 27, 1945 |
| 2,387,993 | Hepp | Oct. 30, 1945 |
| 2,407,214 | Birch et al. | Sept. 10, 1946 |
| 2,414,651 | Latchum, Jr. | Jan. 21, 1947 |
| 2,453,044 | Staff | Nov. 2, 1948 |
| 2,490,866 | Gerhart | Dec. 13, 1949 |